US00RE35153E

United States Patent [19]

Chiu

[11] E Patent Number: Re. 35,153

[45] Reissued Date of Patent: Feb. 6, 1996

[54] HUMIDIFIER WITH FLOAT ACTIVATED WATER LEVEL RESPONSIVE TURN OFF

[75] Inventor: Bernard Chiu, Ashland, Mass.

[73] Assignee: Duracraft Corporation, Whitinsville, Mass.

[21] Appl. No.: 234,386

[22] Filed: Apr. 28, 1994

Related U.S. Patent Documents

Reissue of:

[64] Patent No.: 5,108,663
Issued: Apr. 28, 1992
Appl. No.: 687,141
Filed: Apr. 18, 1991

U.S. Applications:

[63] Continuation-in-part of Ser. No. 509,885, Apr. 17, 1990, Pat. No. 5,034,162.

[51] Int. Cl.[6] ..... B01F 3/04

[52] U.S. Cl. ..... 261/26; 261/107

[58] Field of Search ..... 261/26, 107

[56] References Cited

U.S. PATENT DOCUMENTS

| | | | |
|---|---|---|---|
| 2,054,200 | 9/1936 | Langford | 219/39 |
| 2,424,268 | 7/1947 | Delano | 219/552 |
| 3,598,370 | 8/1971 | Hoag | 261/26 |
| 3,637,194 | 1/1972 | Swimmer et al. | 261/26 |
| 3,811,661 | 5/1974 | Proctor | 261/26 |
| 3,914,349 | 10/1975 | Stipanuk | 261/29 |
| 4,028,444 | 6/1977 | Brown et al. | 261/122 |
| 4,051,205 | 9/1977 | Grant | 261/70 |
| 4,563,313 | 1/1986 | Tsuaki | 261/81 |
| 4,853,161 | 8/1989 | Huang | 261/81 |
| 4,865,775 | 9/1989 | Steiner et al. | 261/24 |
| 5,014,338 | 5/1991 | Glucksman | 392/405 |
| 5,034,162 | 7/1991 | Chiu | 261/107 |
| 5,143,656 | 9/1991 | Marino et al. | 261/26 |
| 5,252,260 | 10/1993 | Schuman | 261/26 |

FOREIGN PATENT DOCUMENTS

| | | | |
|---|---|---|---|
| 3507544 | 9/1986 | Germany | 261/99 |

OTHER PUBLICATIONS

Sears Owners Manual for Kenmore™ Quiet Comfort™ Evaporative Console Humidifier bearing notation "Printed in U.S.A. May 1990" (see last page, lower right hand corner).

*Primary Examiner*—Tim R. Miles

[57] ABSTRACT

A humidifier including a base defining a reservoir for retaining a liquid volume having an upper surface; a humidification unit removably mounted on the base and having an electrically energized humidifier adapted to induce dispersion of liquid retained by the reservoir, and a switch adapted in an active condition to energize the humidifier and in an inactive condition to cause deenergization thereof; and an actuator retained by the base and adapted for movement between activating and inactivating positions with respect to the switch, the actuator adapted in its activating positions to actuate the switch into its active condition and in its inactivating positions to actuate the switch into its inactive condition and wherein both given changes in the level of the upper surface and movement of the humidification unit relative to the base produce the controlling movement of the [actuator] *switch*. Mounting of a switch on a removable humidification unit and an actuator for the switch in a base supporting the unit facilitates desired shut-off in response to either an inadequate water supply or removal of the unit.

16 Claims, 3 Drawing Sheets

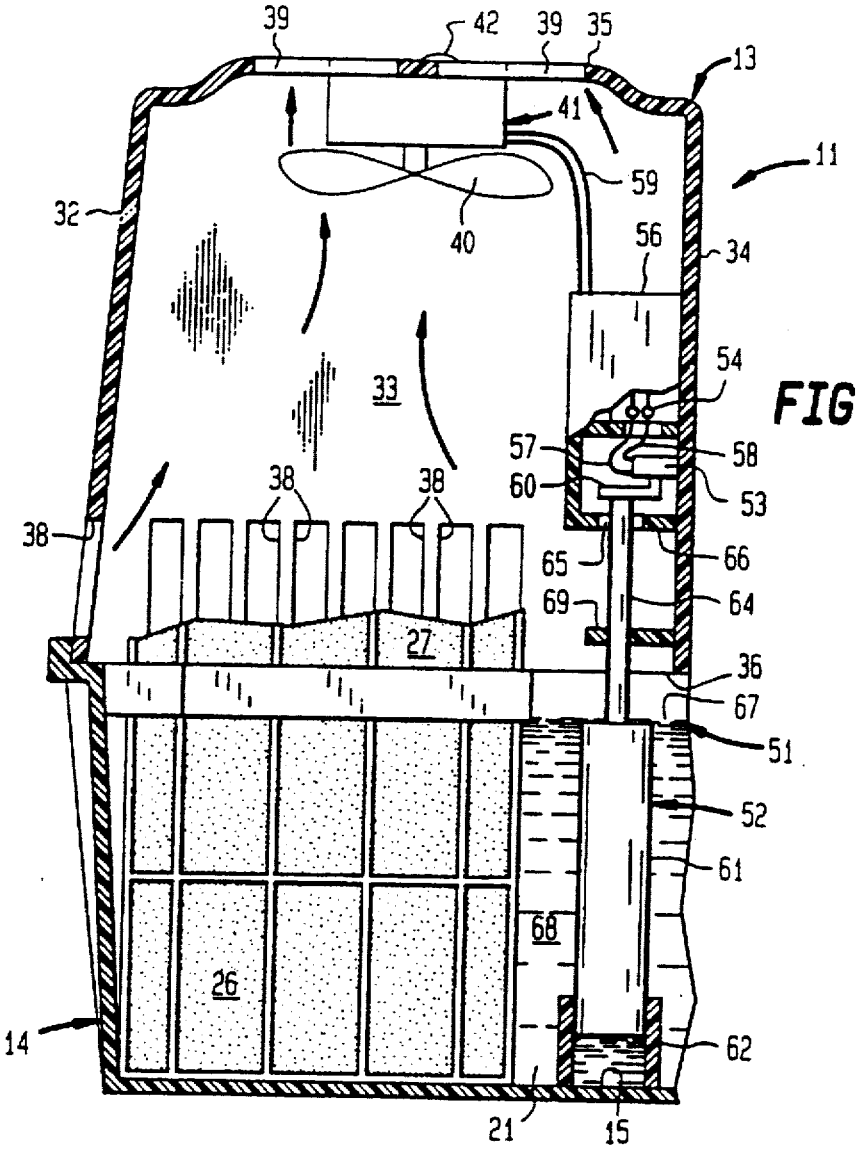
FIG. 4
FIG. 2
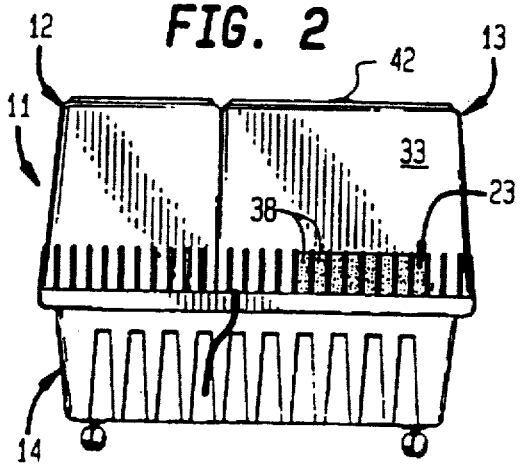

HUMIDIFIER WITH FLOAT ACTIVATED WATER LEVEL RESPONSIVE TURN OFF

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of U.S. patent application Ser. No. 07/509,885 filed Apr. 17, 1990, *now U.S. Pat. No.* 5,034,162, entitled High Capacity Portable Humidifier.

BACKGROUND OF THE INVENTION

This invention relates generally to humidifiers and, more particularly, to a humidifier with an improved liquid level responsive shut-off.

Various types of humidifiers are used to increase the humidity in a living environment. Such humidifiers use a variety of different output mechanisms to disperse from a supply reservoir water which has been preconditioned by, for example, atomization, evaporation and vaporization. In the interest of energy conservation and safety, many humidifiers are equipped with control systems that deenergize an electrically energized output mechanism in response to the exhaustion of the unit's water supply. Although providing a desired shut-off function, prior liquid level responsive control systems have exhibited various individual and collective deficiencies such as high cost, irratic performance, and cumbersome design configurations.

The object of this invention, therefore, is to provide a humidifier with an improved control system for deenergizing an electrically operated output mechanism in response to an absence of a sufficient volume of water in a supply reservoir.

SUMMARY OF THE INVENTION

The invention is a humidifier including a base defining a reservoir for retaining a liquid volume having an upper surface; a humidification unit removably mounted on the base and having an electrically energized humidifier adapted to induce dispersion of liquid retained by the reservoir, and a switch adapted in an active condition to energize the humidifier and in an inactive condition to cause deenergization thereof; and an actuator retained by the base and adapted for movement between activating and inactivating positions with respect to the switch, the actuator adapted in its activating positions to actuate the switch into its active condition and in its inactivating positions to actuate the switch into its inactive condition and wherein both given changes in the level of the upper surface and movement of the humidification unit relative to the base produce the controlling movement of the actuator. Mounting of a switch on a removable humidification unit and an actuator for the switch in a base supporting the unit facilitates desired shut-off in response to either an inadequate water supply or removal of the unit.

According to one feature of the invention, the actuator comprises a float having a buoyant lower end disposed in the reservoir and adapted to be moved by changes in the level of the upper surface, and an upper end adapted to engage and actuate the switch, the float being moved into its activating position by levels of the upper surface above a predetermined level and into its inactivating positions by levels below the predetermined level. This feature provides the desired shut-off control with a highly functional structural arrangement.

According to yet other features of the invention, the humidifier includes a blower for producing air flow, wick means having supply portions disposed in the reservoir below the upper surface and evaporation portions disposed to intercept and transmit the air flow. The shut-off system is particularly well suited for use with an evaporative humidifier.

According to other features, the invention includes a guide for guiding movement of the float, and the switch is an electrical switch operated by engagement with the upper end of the float. The guide insures proper movement of the float in response to changes in the upper surface level.

According to still another feature, the invention includes a liquid supply tank removably mounted on the base and juxtaposed with the humidification unit. The conveniently located supply tank provides controlled liquid flow into the reservoir thereby increasing storage capacity.

DESCRIPTION OF THE DRAWINGS

These and other objects and features of the invention will become more apparent upon a perusal of the following description taken in conjunction with the accompanying drawings wherein:

FIG. 2 is a rear elevational view of the humidifier shown in FIG. 1;

FIG. 4 is a cross-sectional view taken along lines 4—4 of FIG. 1.

DESCRIPTION OF THE PREFERRED EMBODIMENT

Figure 1:
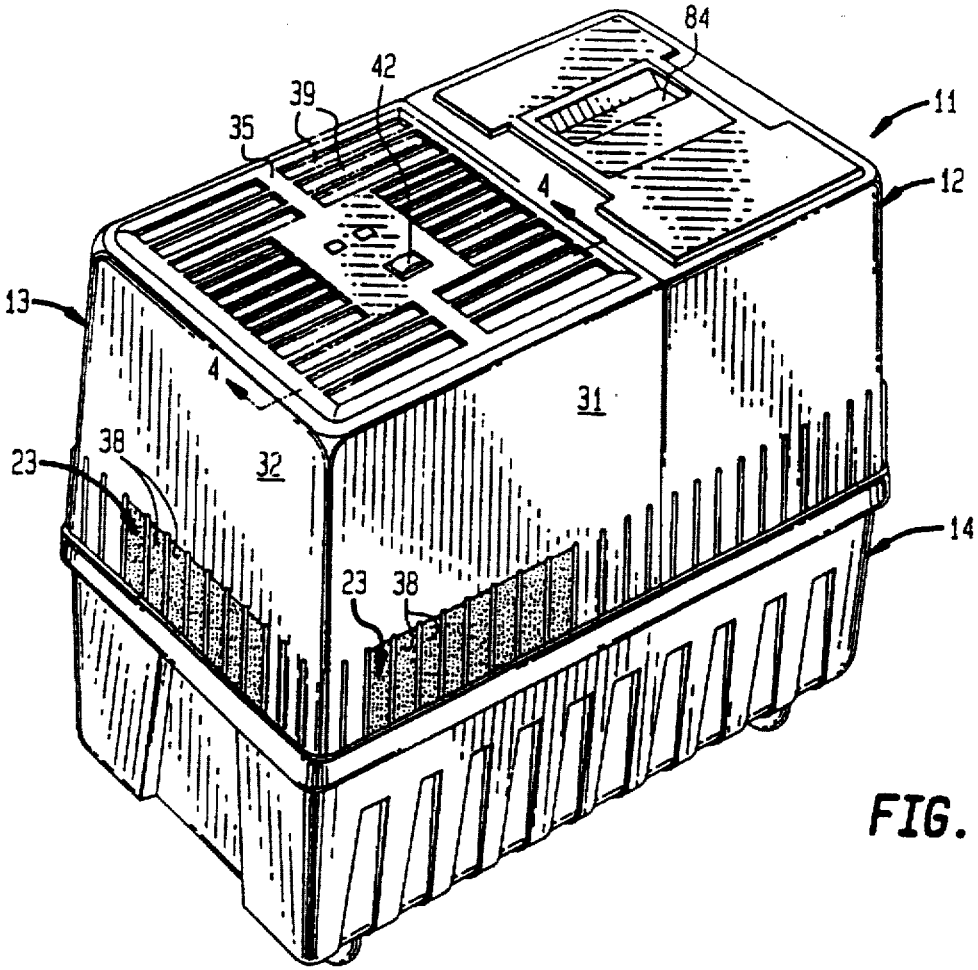
FIG. 1 is a front perspective view of a portable humidifier according to the invention.

A humidifier unit 11 includes a water storage tank 12 and an evaporator housing 13 supported in juxtaposition on a base 14. As shown most clearly in FIG. 3, the base 14 includes a bottom wall 15 and side walls 16–19 that together define a reservoir 21. Projecting inwardly from each of the base side walls 16–18 in a region below the evaporator housing 13 is a rectangularly shaped, horizontally oriented bracket 22. Each of the brackets 22 retains a wick element 23 having a framework 24 forming a plurality of compartments each filled with a suitable absorbant capillary wick material 25. A lower supply portion 26 of each wick element 23 is positioned below its horizontal retaining bracket 22 within the reservoir 21 while an upper evaporation portion 27 thereof is disposed above its bracket 22 and above the reservoir 21. Projecting upwardly from the bottom of the base 14 is a stem 28, the purpose of which is described hereinafter.

The evaporator housing 13 is formed by side walls 31–34 and a top wall 35 and has an open bottom end 36 opening into the reservoir 21. Supporting the bottom end 36 of the housing 13 is an internal shoulder 37 on the base 14. The housing side walls 31–33 are aligned with and directly above, respectively, the base side walls 16–18. Formed in lower portions of each of the housing side walls 31–33 are a plurality of inlet opening slots 38 while a plurality of discharge opening slots 39 are formed in the top wall 35. The interior of the evaporator housing 13 forms parallel air flow paths extending between the inlet slots 38 in each of the housing side walls 31–33 and the discharge slots 39 in the top wall 35. Supported by the top wall 35 and extending into the evaporator housing 13 is a blower assembly 41 that is controlled by an on-off switch 42.

As illustrated in FIG. 4 the humidifier 11 is provided with liquid level responsive shut-off system 51. Included in the system 51 is an elongated, buoyant actuator float element 52 and an electrical switch 53 actuated thereby, and a control circuit 54. The switch 53 and control circuit 54 are enclosed in a housing 56 supported by the sidewall 34 of the evaporator housing 13. Connecting the electrical switch 53 to the control circuit 54 are electrical leads 57, 58. The control circuit 54 is connected also to the motor 41 and the on-off switch 42 by an electrical cable 59. Preferably, the switch 53 is of a conventional type that is internally biased into an inactive open condition but can be moved into an active closed position by an activator lever arm 60. Retaining a buoyant lower end 61 of the actuator element 52 is a receptacle 62 extending upwardly from the bottom wall 15 of the base 14. The opposite upper end 64 of the actuator element 52 extends through an opening 65 in a bottom wall 66 of the housing In response to changes in the level of an upper surface 67 of a liquid volume 68 in the reservoir 21, the buoyant actuator 52 moves either upwardly or downwardly in a path guided by a guide bracket 69 supported by the sidewall 34 of the evaporator housing 13. With the upper surface 67 of the liquid volume 68 at a predetermined level L or above, the upper end 64 of the actuator element 52 is moved into an activating position engaging the lever arm 60 and moving the switch 53 into its active closed condition. However, at levels of the upper surface 67 less than the predetermined level L, the actuator element 52 floats downwardly to move the upper end 64 into an inactivating position that eliminates forcible engagement with the lever arm 60. The switch 53 is thereby induced into its inactive open condition. Also, regardless of the level of the upper surface 67 of the liquid volume 68, relative separating movement between the upper end 64 of the actuating element 52 and 40 the switch 53 resulting from removal of the evaporation housing 13 from the base 14 will cause the switch 53 to assume its inactive open condition.

As shown in FIG. 4, the control circuit 54 includes a plurality of interconnected transistors Q1–Q4 that receive DC power from a full wave rectifier bridge 91. Supplying the rectifier bridge 91 is the secondary of a transformer 93 having a primary connected to an AC supply 94. Resistors R1–R3 and a first filter delay circuit C1, R4 are connected to the base of the transistor 50 Q1. Coupling the transistors Q1 and Q2 are resistors R5 and R6. A resistor R8 and a second filter delay circuit C2, R7 are connected to the base of the transistor Q3, the emitter of which is connected to the base of the transistor Q4. Connected between the transistors Q3, 55 Q4 and the DC supply is a parallel combination of a resistor R9 and a winding of a relay 99. Contacts 98 of the relay 99 and the manually operated on-off switch 42 connect the motor 41 of the fan blower 40 to the AC supply 94.

OPERATION

To prepare the humidifier 11 for use, the tank 12 is removed from the base 14 and the reservoir 21 is filled with water. In addition, the tank 12 is filled and then inverted and positioned on the base 14. Water from the tank 12 flows through a control valve (not shown) into the reservoir 21. As long as a supply of water exists in the tank 12, the upper surface 67 of the water volume 68 is retained at a desired level. Operation of the supply tank 12 is conventional and a disclosure thereof appears, for example, in U.S. patent application No. 07/509,885, now U.S. Pat. No. 5,034,162.

Figure 3:
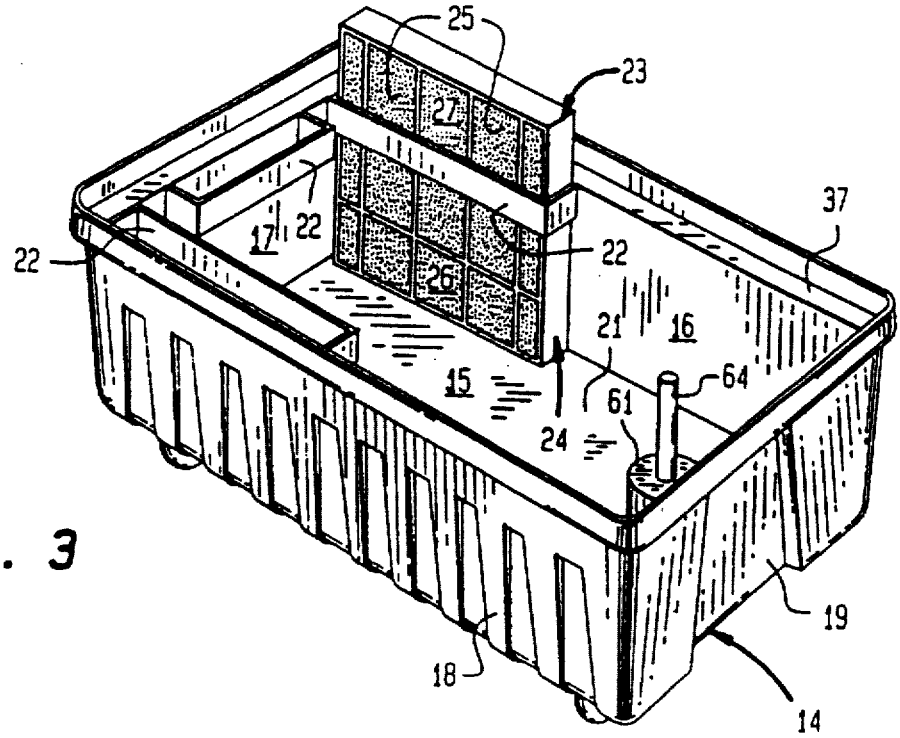
FIG. 3 is a rear perspective view of a base unit of the humidifier shown in FIG. 1.

Prior to initiating operation of the humidifier unit 11, one of the wick elements 23 is appropriately positioned within each of the brackets 22 on the base 14 after removal of the housing 13. As shown in FIG. 3, with the wick element 23 properly positioned, its supply portion 26 includes an outer surface disposed directly adjacent and parallel to the base side wall 16. Also an outer surface of the evaporator portion 27 of the wick element 23 is disposed directly adjacent and parallel to the inlet slots 38 formed in the housing side wall 31. Although for reasons of clarity, only a single wick element 23 is shown in FIG. 3, it will be understood that an identical wick element will be similarly positioned in each of the brackets 22. Consequently, the supply portion of each wick element 23 will be below the upper surface 67 of the water volume 68 in the reservoir 21 while the evaporator portion 27 of each element 23 will lie above that level and directly in an air flow path between one set of the inlet slots 38 and the discharge slots 39.

Figure 5:
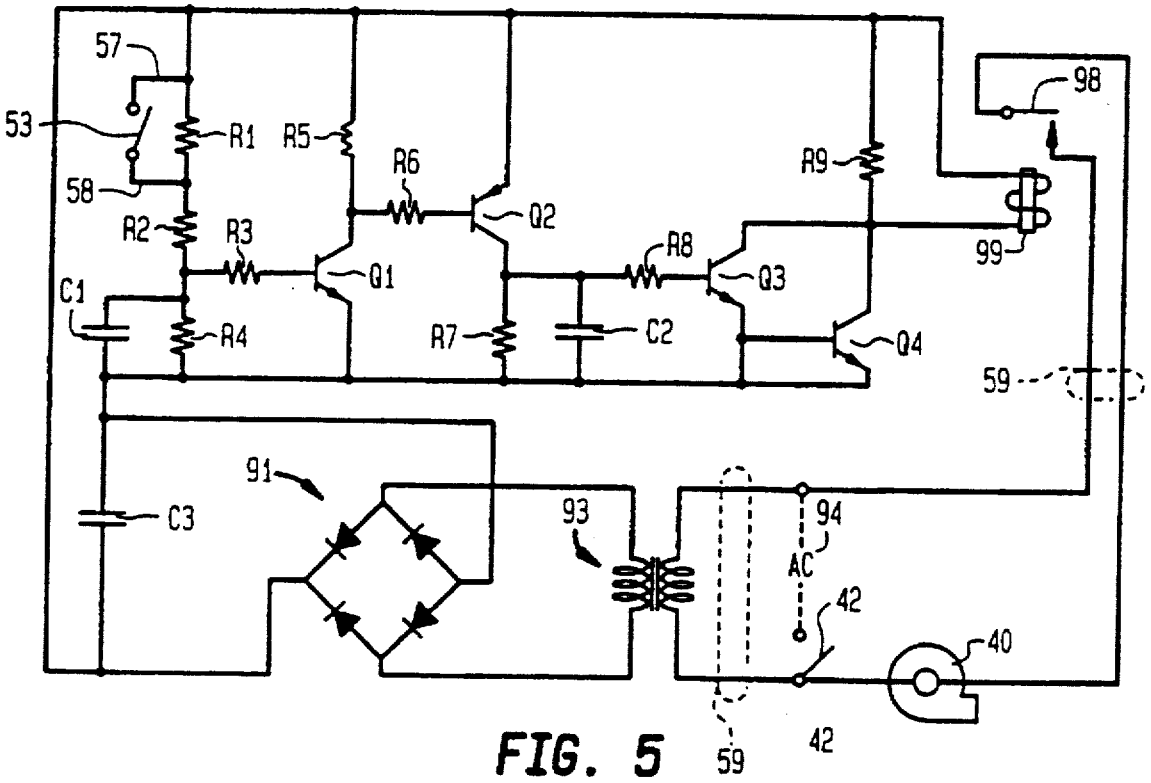
FIG. 5 is a schematic circuit diagram of a control circuit used in the humidifier shown in FIGS. 1–4.

Energization of the fan 10 is established by closing the on-off switch 42 shown in FIG. 5 to apply supply voltage to the control circuit 54. With the water surface 67 above the predetermined level L (FIG. 4), the float 52 maintains the upper end 64 in operative engagement with the arms 60 to close the switch 53 and thereby short the resistor R1. The output signal provided by shorting of the resistor R1 produces conduction of the transistor A1 to sequentially produce conduction of the transistors Q2, Q3, Q4. Resultant current flow through the relay 99 closes the contacts 98 to energize the fan 40 through the closed on-off switch 42.

In response to a decrease of water volume 68 that brings the surface 67 below the predetermined level L, the float actuator 52 moves downwardly into an inactivating position that eliminates operative engagement between the upper end 64 and the arm 60. The resultant opening of the switch 53 eliminates the output signal provided by the shorted resistor R1 and renders the transistor Q1 non-conductive. That in turn renders the transistors Q2–Q4 non-conductive and deenergizes the relay 99 to open the contacts 98 and eliminate the flow of electrical current from the AC source 94 to the blower 40. However, turn-off of the transistor Q1 is delayed for a given delay period established by the time constant of the first delay circuit R3, C1, R4. That delay prevents erratic on-off cycling of the contacts 98. Such erratic operation could result from wave motion at the surface 67 of the water 68 caused, for example, by mechanical vibration. A second delay period is provided by the time constant of the second delay circuit RS, C2, R7 connected to the base of the transistor Q3. Preferably, the first and second delay circuits C1, R3, R4 and C2, R7, RS, respectively, are tuned to different frequency ranges so as to eliminate different noise inputs to the controlled relay 99.

Obviously, many modifications and variations of the present invention are possible in light of the above teachings. It is to be understood, therefore, that the invention can be practiced otherwise than as specifically described.

What is claimed is:

1. A humidifier *apparatus* comprising:

a base [means] defining a reservoir for retaining a liquid volume having an upper surface;

a humidification unit removably mounted on said base [means] and comprising an electrically energized humidifier [means] adapted to induced dispersion of liquid retained by said reservoir, a flow passage including a receiving end communicating with said reservoir and a discharge end for discharging dispersed liquid received therefrom, and *a* switch [means] adapted in an active condition to energize said humidifier [means] and in an inactive condition to cause deenergization thereof; [and]

an actuator [means] retained by said base [means] and adapted for movement between activating and inactivating positions with respect to said switch [means], said actuator [means] adapted in said activating positions to actuate said switch [means] into said active condition and in said inactivating positions to actuate said switch [means] into said inactive condition and wherein both given changes in the level of said upper surface and movement of said humidification unit relative to said base [means] produce said movement of said [actuator means] *switch; and*

*a guide for guiding movement of said actuator between said activating and inactivating positions.*

2. A humidifier *apparatus* according to claim 1 wherein said humidifier [means] comprises a blower [means] adapted to produce air flow through said passage between said receiving end and said discharge end.

3. A humidifier *apparatus* according to claim 2 including *a* wick [means] having supply portions disposed in said resorvoir below said upper surface and evaporation portions disposed to intercept and transmit said air flow.

4. A humidifier *apparatus* according to claim 3 wherein said wick [means] is adapted to provide by capillary action a liquid flow from said supply portions to said evaporation portions.

5. A humidifier *apparatus* according to claim 4 wherein said actuator [means] comprises *a* float [means] having a buoyant lower end disposed in said reservoir and adapted to be moved by changes in the level of said upper surface, and an upper end adapted to engage and actuate said switch [means], said float [means] being moved into its activating position by levels of said upper surface above a predetermined level and into its inactivating positions by levels of said upper surface below said predetermined level.

[6. A humidifier according to claim 5 including guide means for guiding movement of said float means.]

7. A humidifier *apparatus* according to claim [6] *5* wherein said switch [means] comprises an electrical switch operated into said active condition by engagement with said upper end of said float [means].

8. A humidifier [apparatus] according to claim 2 wherein said actuator [means] comprises *a* float [means] having a buoyant lower end disposed in said reservoir and adapted to be moved by changes in the level of said upper surface, and an upper end adapted to engage and actuate said switch [means], said float [means] being moved into its activating position by levels of said upper surface above a predetermined level and into its inactivating positions by levels of said upper surface below said predetermined level.

[9. A humidifier according to claim 8 including guide means for guiding movement of said float means.]

10. A humidifier *apparatus* according to claim [9] *8* wherein said switch [means] comprises an electrical switch operated into said active condition by engagement with said upper end of said float [means].

11. A humidifier *apparatus* according to claim 1 wherein said actuator [means] comprises *a* float [means] having a buoyant lower end disposed in said reservoir and adapted to be moved by changes in the level of said upper surface, and an upper end adapted to engage and actuate said switch [means], said float [means] being moved into its activating position by levels of said upper surface above a predetermined level and into its inactivating positions by levels of said upper surface below said predetermined level.

[12. A humidifier according to claim 11 including guide means for guiding movement of said float means.]

13. A humidifier *apparatus* according to claim [12] *11* wherein said switch [means] comprises an electrical switch operated into said active condition by engagement with said upper end of said float [means].

14. A humidifier *apparatus* according to claim 1 including a liquid supply tank removably mounted on said base [means] and juxtaposed with said humidification unit, said supply tank adapted to provide controlled liquid flow into said reservoir.

15. A humidifier *apparatus* according to claim 14 wherein said humidifier [means] comprises a blower [means] adapted to produce air flow through said passage between said receiving end and said discharge end.

16. A humidifier *apparatus* according to claim 15 including *a* wick [means] having supply portions disposed in said reservoir below said upper surface and evaporation portions disposed to intercept and transmit said air flow.

17. A humidifier *apparatus* according to claim 16 wherein said wick [means] is adapted to provide by capillary action a liquid flow from said supply portions to said evaporation portions.

18. A humidifier *apparatus* according to claim 17 wherein said actuator [means], comprises *a* float [means] having a buoyant lower end disposed in said reservoir and adapted to be moved by changes in the level of said upper surface, and an upper end adapted to engage and actuate said switch [means], said float [means] being moved into its activating position by levels of said upper surface above a predetermined level and into its inactivating positions by levels of said upper surface below said predetermined level.

[19. A humidifier according to claim 18 including guide means for guiding movement of said float means.]

20. A humidifier *apparatus* according to claim [19] *18* wherein said switch [means] comprises an electrical switch operated into said active condition by engagement with said upper end of said float [means].

* * * * *